C. H. PECK.
PORTABLE STREET TRAFFIC SIGNAL.
APPLICATION FILED MAR. 8, 1916.

1,317,819.

Patented Oct. 7, 1919.
3 SHEETS—SHEET 1.

Witnesses

Inventor
Charles H. Peck
By Williamson
Attorneys

C. H. PECK.
PORTABLE STREET TRAFFIC SIGNAL.
APPLICATION FILED MAR. 8, 1916.
1,317,819.
Patented Oct. 7, 1919.
3 SHEETS—SHEET 2.
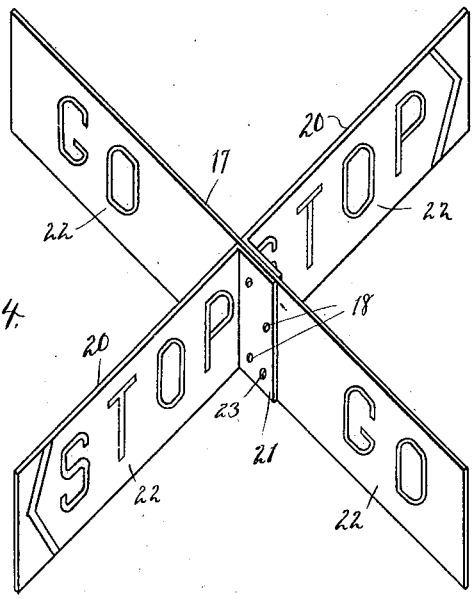
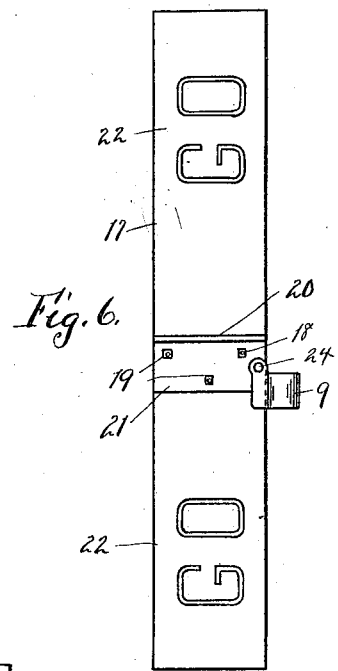
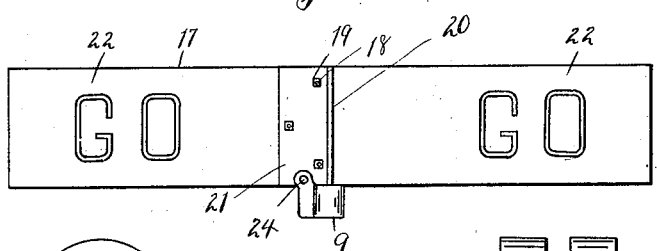
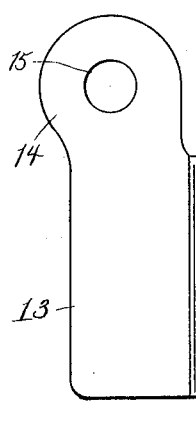
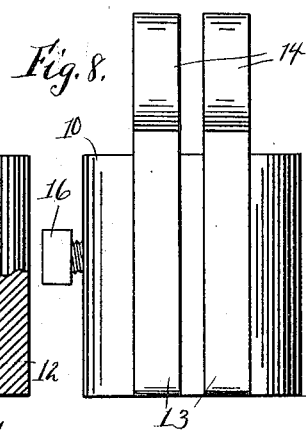
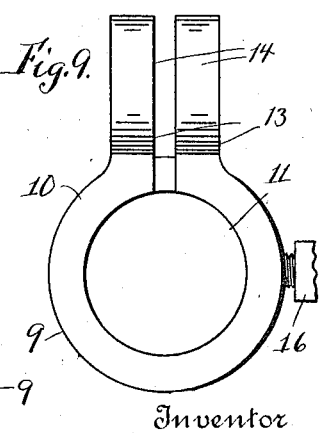
Witnesses
M. Tobias
Inventor
Charles H. Peck
By W. W. Williamson
Attorneys

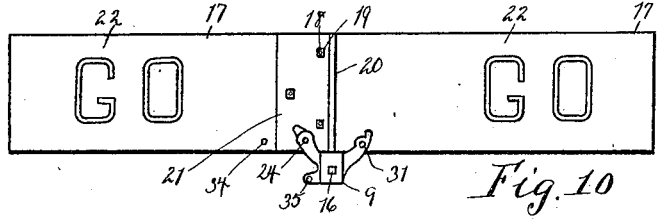
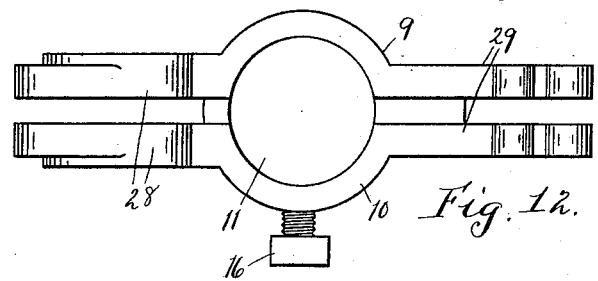
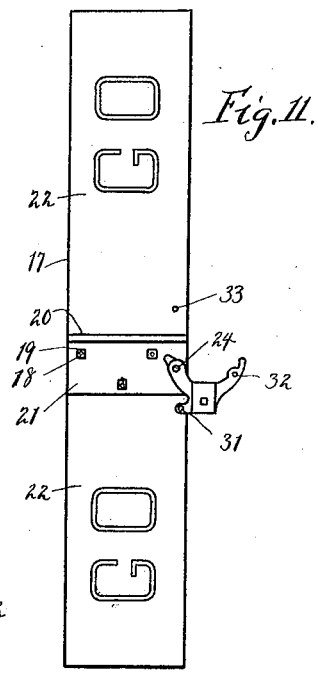
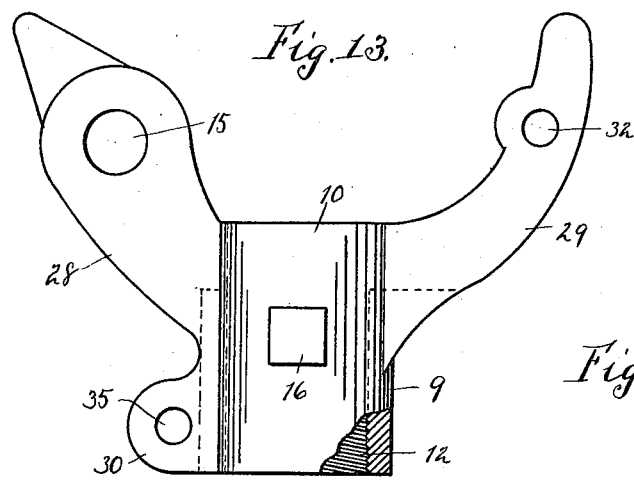
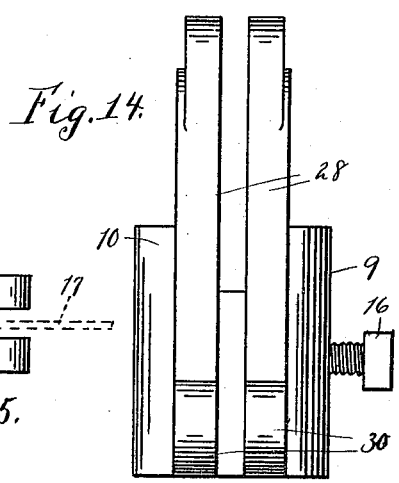
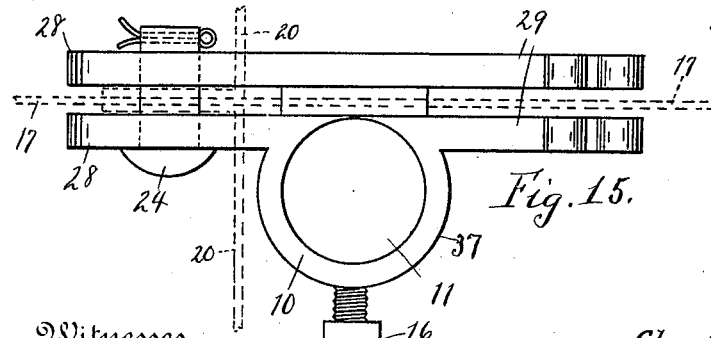

UNITED STATES PATENT OFFICE.

CHARLES H. PECK, OF PHILADELPHIA, PENNSYLVANIA.

PORTABLE STREET-TRAFFIC SIGNAL.

1,317,819.　　　　　Specification of Letters Patent.　　　Patented Oct. 7, 1919.

Application filed March 8, 1916.　Serial No. 82,833.

*To all whom it may concern:*

Be it known that I, CHARLES H. PECK, a citizen of the United States, residing at Philadelphia, in the county of Philadelphia and State of Pennsylvania, have invented new and useful Improvements in Portable Street-Traffic Signals, of which the following is a specification.

My invention relates to new and useful improvements in portable street traffic signals, and has for its object to provide an exceedingly simple and effective device of this character, whereby definite, visible signals may be given to street traffic, including vehicles and pedestrians, so that the traffic at a street corner will be moving along but one street at a time, say for instance north and south, while the traffic upon crossing the first named street, say east and west, will be at a standstill, thereby reducing to a minimum the possibility of accidents.

A further object of the invention is to provide a street traffic signal comprising four arms formed from a number of strips of material, such as sheet metal, and so arranged that each arm is at right angles to the adjacent arms, and these arms having designation marks thereon to indicate to the traffic, that is the pedestrians and drivers of vehicles whether to proceed or halt.

Another object of the invention is to provide a portable street traffic signal which may be shipped in a knock-down or disconnected condition, and which when received by the purchaser may be readily and quickly put together and set up for use.

A still further object of the invention is to provide a portable street traffic signal which may be mounted upon a suitable stand or secured to a lamp post, telegraph pole or other street posts consisting of a bearing in which is rotatably mounted a shaft having a support or head to which is pivotally secured the semaphore consisting of four arms, said semaphore when in use maintaining a horizontal position, but when out of use maintaining a vertical position, so that it is difficult to read the designations and by the position of said designations will not interfere with traffic.

With these ends in view, my invention consists in the details of construction and combination of elements hereinafter set forth and then specifically designated by the claims.

In order that those skilled in the art to which this invention appertains, may understand how to make and use the same, I will describe its construction in detail, referring by numeral to the accompanying drawings forming a part of this application, in which—

Fig. 4, is an enlarged perspective view of the portable semaphore or signal arms.

Fig. 5, is a side elevation thereof, showing the support or head connected therewith, showing its relative position while in use.

Fig. 6, is a similar view, showing the relative position of the semaphore when out of use.

Fig. 7, is an enlarged side elevation of the support or head, a portion thereof being broken away to clearly illustrate the construction.

Fig. 8, is a similar view at right angles to Fig. 7.

Fig. 9, is a plan view thereof.

Fig. 10, is a side elevation of the signal semaphore, showing a slightly modified form of support or head connected therewith, showing it in its normal position while in use.

Fig. 11, is a similar view, showing the semaphore or signal arms in its relative position while not in use.

Fig. 12, is an enlarged plan view of a modified form of support or head.

Fig. 13, is a side elevation thereof, a portion thereof being broken away to show the internal threads.

Fig. 14, is a similar view at right angles to Fig. 13.

Fig. 15, is a plan view of a further modified form of support or head.

Figure 1:
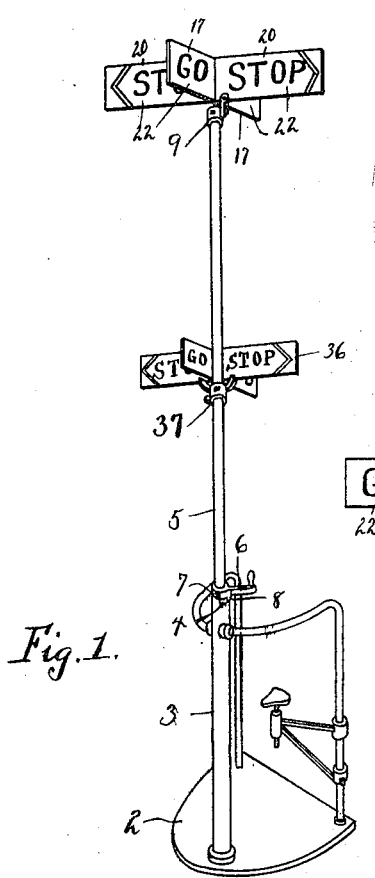
Figure 1, is an isometric view of a portable street traffic signal made in accordance with my invention.

In carrying out my invention as here embodied 2 represents a stand or base carrying a tubular support 3, the upper edge of which is provided with a notch 4 of a length equal to about one quarter of the circumference of the support. In the support 3 is rotatably mounted an upright or staff 5, and to this is secured a handle 6 in any suitable manner and held in its adjusted position by a set screw 7 or its equivalent, said handle 6 having a projection or spur 8 adapted to project into the notch 4 and operating therein, engaging the end walls of said notch to limit the rotatable movements of the upright or staff 5. On the upper end of the staff 5 is mounted a support or head 9, one construction of which is shown in detail in Figs. 7 to 9 inclusive, and consists of a ring or collar 10 having a central bore 11 threaded throughout a portion of its length as at 12, whereby said support may be threaded upon the upper end of the staff or upright 5, the latter also being provided with threads at its upper end.

With the collar 10 is formed a pair of parallel integral spaced ears 13 running the entire length of said collar, and projecting above the upper edge thereof to form lugs or extensions 14, said lugs having alined holes 15 therein for the reception of a bolt as will be hereinafter described.

In order to hold the head or support in its adjusted position I provide a set screw 16 or its equivalent which is threaded through the collar, and is adapted to engage the upright or staff 5, thereby firmly holding the parts in their relative positions. The semaphore or signal proper consists of a strip of material 17 such as metal and at the center thereof is secured thereto as by bolts 18 and nuts 19, two other strips of material 20 projecting in opposite directions from opposite faces of the first named strips 17, the bolts passing through the right angled extensions 21 formed with the strips 20 and through the strip 17. When these three strips are secured together in this manner, four similar signal arms 22 are formed or provided, the faces of which may be provided with designation marks such as the words "Stop" and "Go". The word "Stop" or other designation device is placed upon both sides of the two arms, which are in alinement, or which project in opposite directions from the other two arms, and in addition to the word Stop, a V-shaped mark or arrow head may be provided to indicate the direction in which the traffic especially the pedestrians may travel when the word Stop can be seen.

On both sides of the other two arms, some suitable designation mark is provided such as the word "Go," and will indicate to drivers of vehicles and pedestrians that the street or line of travel across which said arms project is open for travel. The signal proper or semaphore is provided with a hole 23 passing through the right angled extension 21 and the metallic strip 17, and this hole 23 is adapted to aline with the hole 15 in the lugs 14 of the ears 13, when one of the arms 22 and preferably that one against which rests the right angled extension 21 is placed in the space between the lugs 14, said semaphore being pivotally connected with the head or support by means of a bolt 24 passing through the holes 15 and 23. The center of gravity of the semaphore or signal proper is at the meeting point of all of the arms 22, and by pivoting the semaphore by means of one arm beyond the center of gravity to the support or head 9, the lower edge of a portion of all of the arms will rest upon the upper edge of the ring or collar 10, thereby maintaining the semaphore or signal proper in a normal horizontal position.

In practice when the signal is in use, the operator thereof such as a traffic or other police officer moves the handle 6 in the proper direction one quarter of a turn, which will turn the semaphore in the proper direction, so as to throw the arms 22 across the direction of travel of the traffic, and those arms projected across one of the directions of travel or streets, will show the word "Stop" and indicate to the pedestrians and drivers of vehicles that the direction of travel or the street at the crossing is closed to traffic, while the other arm projecting across the other direction of travel or street will exhibit the word "Go", and indicate to the pedestrians and drivers of vehicles on the street that said street is open to travel.

After the desired length of time has elapsed, the officer may then move the handle 6 in the opposite direction within the limits of the slot 4, which will rotate the semaphore one quarter of a turn and reverse the positions of the signal arms.

While the officer is off duty, the signal proper or semaphore may be moved about the pivoting bolt 24, so as to place the signal in the position shown in Fig. 6 or in a vertical position, and this will indicate to the pedestrians and the drivers of vehicles that they may proceed in any direction. This is done to prevent holding up traffic while the officer is off duty, for should the signal be left in the position shown in Fig. 5, one street or direction would be always closed, which would greatly confuse pedestrians and drivers of vehicles, and often cause unwarranted accidents.

Figure 2:
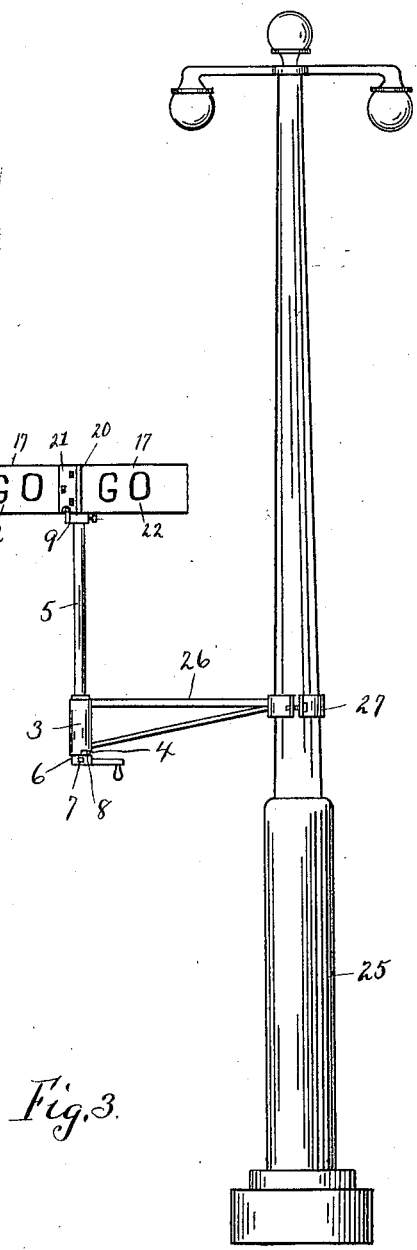
Fig. 2, is a side elevation of the signal, showing one manner in which it may be secured to a lamp post or other pole.
Figure 3:
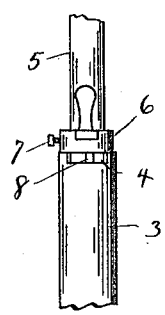
Fig. 3, is an enlarged fragmentary side elevation of the bearing and staff and upright of the signal, showing the way in which the handle may be secured thereto, and how the signal is stopped at its different positions.

In Fig. 2 I have shown my improved portable street traffic signal secured to a post or hole 25, here represented as a lamp post. In this case the bearing 3 is provided with a bracket 26, having suitable fastening means such as a split collar 27 adapted to encircle the post and be securely fastened thereto. The bearing 3 being relatively short, the staff 5 may pass entirely therethrough with the lower end projecting beyond said bearing, and on this projecting end may be fastened the operating handle 6, the lug or projection 8 thereof projecting into the notch 4 formed in the bearing said notch being in this form of device at the lower end of the bearing, instead of at the upper end as shown in Fig. 1.

The bracket 26 and the attaching means 27 in this form of the device takes the place of the stand or support 2.

In Figs. 10 to 14 inclusive I have shown a slightly modified form of supporting head, in which the ring or collar 10 is provided with two pair of oppositely projecting spaced arms 28, and 29, formed integral with the ring or collar 10. Also formed integral with the ring or collar 10 is a pair of spaced parallel lugs 30 in alinement with the pair of spaced arms 28. When this form of supporting head is used, one of the arms 22 of the signal proper or semaphore is mounted between the spaced arms 28 and pivoted thereto by a bolt 24 passing through holes 15 formed in the arms 28, and through the hole 23 in one of the arms of the signal. The other signal arm projects in the opposite direction to the signal arm situated between the arms 28, rests between the arms 29 when the semaphore is in a signaling or horizontal position as shown in Fig. 10, and this semaphore may be held against accidental displacement by a bolt 31 passing through the hole 32 in the arms 29 and the hole 33 in one of the signal arms.

When the signal is not in use the bolt 31 may be readily removed and the semaphore moved to the vertical position as shown in Fig. 11, at which time the hole 34 will aline with the holes 35 in the lugs 30, and when in this position the bolt 31 may be passed through these holes 34 and 35, so as to hold the semaphore in its vertically adjusted position, and prevent the same from being accidentally thrown into its signaling or horizontal position.

The semaphore normally being relatively high, and in a position not easily discernible by pedestrians, I have found it advisable in some cases to provide an additional semaphore which is mounted upon the upright or staff 5, in any suitable manner some distance below the main semaphore, and at a height readily discernible by pedestrians.

As here shown this semaphore 36 is formed in the same manner as the main semaphore, and the arms thereof are each provided with designation marks, the same as in the principal semaphore. This semaphore is secured to the support 37 adapted to be secured to the staff or upright 5.

In Fig. 15 I have shown the support 37 for holding the pedestrian sign or signal made up of the arms 36 shown in Fig. 1, which is usually used in combination with the main signal or semaphore and in a lower position, or at a height readily discernible by a pedestrian. This support 37 comprises the collar 10 and the diametrically oppositely projecting arms 28 and 29 offset from the center of the collar, whereby the semaphore may be raised and lowered along the upright 5, the arms of the semaphore being situated beside the upright 5 as shown by dotted lines in Fig. 15.

The gist of the invention is to provide a street signal which will be light in weight so that the same may be readily moved from place to place by a single person; to provide a signal the semaphore or signal arms of which may be dropped or moved out of signal position when the signal is not in use, or while the attendant is absent therefrom, and to provide a signal the parts of which may be readily disconnected and connected.

From the foregoing description it will be seen that the signal arms of the two semaphores may be readily disconnected and placed approximately flat against each other, so that a very small package is formed when the signal is packed for shipment, and when the signal has reached its destination, the parts thereof may be readily placed together and secured in position.

Of course I do not wish to be limited to the exact details of construction as herein shown, as these may be varied within the limits of the appended claims without departing from the spirit of my invention.

Having thus fully described my invention, what I claim as new and useful, is—

1. In a device of the character stated a bearing, an upright, rotatably mounted therein, means for rotating said upright, a head detachably secured to the upper end of said upright, said head comprising an internally threaded collar, whereby the same may be detachably mounted upon the upper end of the upright, a pair of parallel spaced ears formed integral with the collar, the upper ends of said ears projecting beyond the collar to form lugs having holes therein, and a semaphore consisting of a plurality of signaling arms, one of said arms adapted to rest between the lugs of the spaced ears and having a hole therein adapted to aline with the holes in said lugs, and a bolt passing through said holes in the lugs and the hole in the arm, a portion of all of the arms adapted to rest upon the upper edge of the head when the semaphore is in a horizontal position, and the arm by which the semaphore is pivoted to the head adapted to rest within the space between the ears when the semaphore is in a vertical position.

2. In a device of the character stated a bearing, an upright or staff rotatably mounted therein, a head detachably secured to said upright, said head consisting of a collar, two pair of parallel spaced oppositely projecting integral arms, and a pair of parallel spaced integral lugs alining with one pair of said arms, a semaphore pivoted between one pair of arms with a portion thereof situated between the other pair of said arms, when in a signal position, and another portion of said semaphore adapted to be situated between the pair of lugs when out of signal position.

In testimony whereof, I have hereunto affixed my signature in the presence of a subscribing witness.

CHARLES H. PECK.

Witness:
MOLLIE TOBIAS.

Copies of this patent may be obtained for five cents each, by addressing the "Commissioner of Patents, Washington, D. C."